No. 873,424. PATENTED DEC. 10, 1907.
F. GREENE.
NUT LOCK.
APPLICATION FILED AUG. 10, 1907.
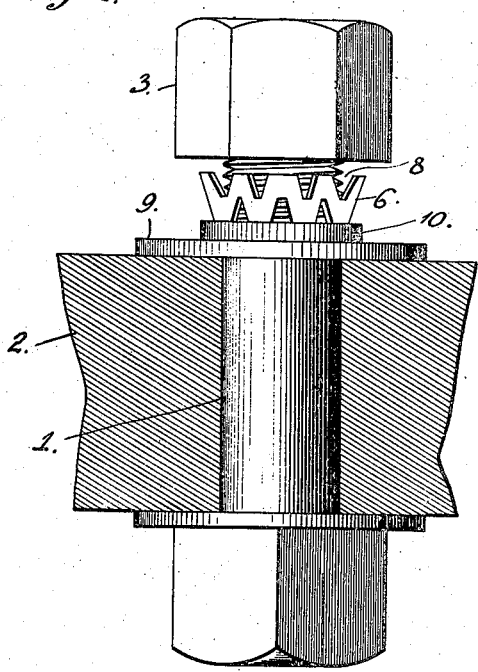
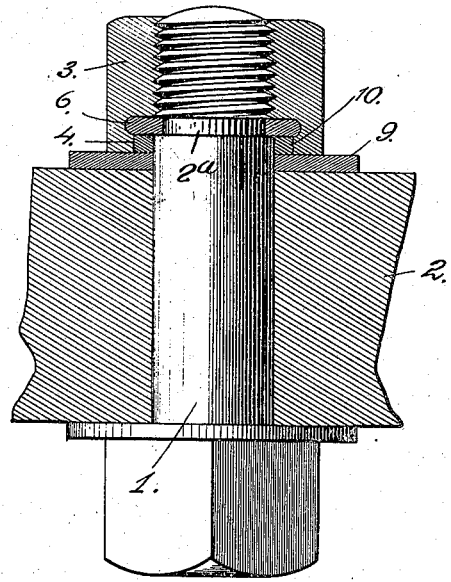
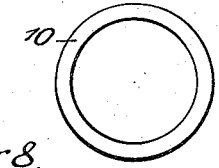
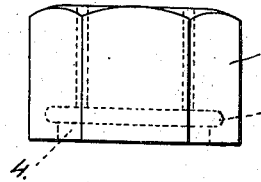
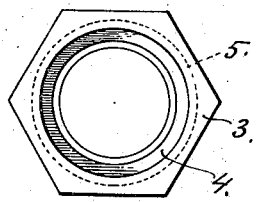
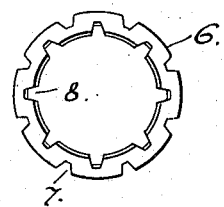
Witnesses
A. H. Rabsair,
N. H. Butler.
Inventor
Frederick Greene
By H. Everitt,
Attorneys

UNITED STATES PATENT OFFICE.

FREDERICK GREENE, OF CANONSBURG, PENNSYLVANIA.

NUT-LOCK.

No. 873,424.  Specification of Letters Patent.  Patented Dec. 10, 1907.

Application filed August 10, 1907. Serial No. 387,947.

*To all whom it may concern:*

Be it known that I, FREDERICK GREENE, a citizen of the United States of America, residing at Canonsburg, in the county of Washington and State of Pennsylvania, have invented certain new and useful Improvements in Nut-Locks, of which the following is a specification, reference being had therein to the accompanying drawing.

This invention relates to nut locks, and its primary object is to provide simple but effective means for preventing the loosening of a nut after it has been applied to a bolt.

A further object of the invention is, to provide a nut of novel construction in combination with an expansible or compressible washer, said washer serving to securely lock the nut in position against rotation by vibration, or ordinary wear, but permitting the removal of the nut by means of a wrench.

The invention consists of a nut provided with an annular groove adjacent to its inner side, to receive a compressible washer, and a bolt formed with an annular groove adapted to register with the groove of the nut and also receive said washer.

The invention further consists of a nut having an annular groove to receive a washer, and a supplemental washer seat, in combination with an expansible or compressible washer of copper, tin, or other readily compressible metal.

The construction of the improvement will be fully described hereinafter, in connection with the accompanying drawing which forms a part of the specification, and its novel features will be defined in the appended claims.

In the drawing: Figure 1 is a side elevation of the improved nut lock applied to a bolt, the material through which the bolt extends being shown in section, Fig. 2 is a similar view showing the position of the parts of the nut lock after the nut has been screwed home upon the bolt, Fig. 3 is a side or edge view of the supplemental washer employed, Fig. 4 is a plan of the same, Fig. 5 is a side elevation of the expansible washer constituting an important feature of the invention. Fig. 6 is a bottom plan of Fig. 5, Fig. 7 is a side elevation of the nut, Fig. 8 is an elevation of the inner side of the nut, and Fig. 9 is a vertical sectional view of the same.

The reference numeral 1 designates a bolt, here shown as extending through a section of material 2, and formed adjacent to its inner thread with an annular groove $2^a$, of the same depth as the screw threads.

Upon the threaded end of the bolt is fitted a nut 3. The inner face of the nut is countersunk as at 4, and between the countersunk portion and the threads of the nut an annular groove 5 is formed, which is of greater diameter than the diameter of the countersunk portion.

The compressible washer 6 is of tapering or conical form, and may be constructed of copper, tin, or other readily compressible metal. The edges of the washer are notched to facilitate its compression, the notches 7 in the upper edge alternating with the notches 8 formed in the lower edge.

In operation a washer 9 is slipped upon the bolt and upon this washer is placed a smaller ring or washer 10 adapted to fit the countersunk portion of the nut. The compressible washer 6 is then placed upon the bolt with its smaller end resting against the washer 10. The nut is then placed in position, and when it is screwed to place against the washer 9, the compressible washer 6 will be crushed as illustrated in Fig. 2, with its smaller end in, filling the annular groove $2^a$ of the bolt and its larger end forced into the groove 5 of the nut.

It will be apparent that when the nut has been screwed home upon the bolt to the position shown in Fig. 2, rotation of the nut by vibration or jar will be impossible. The nut may however be removed by means of a wrench without injuring the threads of the bolt, and this constitutes an important feature of the improvement.

I would have it understood that the invention includes all such modifications and changes in the minor details of the construction, as may fall within the terms and scope of the following claims.

Having now described my invention what I claim as new, is:—

1. The combination with a grooved bolt, of a nut provided adjacent to its inner face, with an internal annular groove registering with the groove of the bolt and a compressible washer of conical form having its edges notched to facilitate the compression thereof and the forcing of the same into the grooves of the bolt and nut.

2. In a nut lock, the combination of a bolt provided with an annular groove at the inner end of its threaded portion, and a nut 11.

countersunk on its inner face and having an internal annular groove of greater diameter than the countersunk portion of the nut, of a notched-washer of compressible material adapted to be crushed by the screwing home of the nut on the bolt and thereby forced into the said annular grooves of the said nut and bolt respectively to lock the nut on the bolt.

3. In a nut lock, the combination with a bolt having an annular exterior groove and a nut having an interior annular groove, of a washer of compressible material having both edges thereof notched to facilitate compression of the washer and the entry thereof into the grooves of the nut and bolt.

In testimony whereof I affix my signature in the presence of two witnesses.

FREDERICK GREENE.

Witnesses:
WILL A. McCONNELL,
JAMES CALDWELL.